US007424291B1

United States Patent
Lunsford et al.

(10) Patent No.: US 7,424,291 B1
(45) Date of Patent: Sep. 9, 2008

(54) METHOD AND SYSTEM FOR ENABLING TIMED EVENTS OF A PORTABLE COMPUTING DEVICE TO TRIGGER REMOTE CONTROL OF EXTERNAL DEVICES

(75) Inventors: Michael Lunsford, San Carlos, CA (US); John Cook, Los Gatos, CA (US); David Kammer, Seattle, WA (US)

(73) Assignee: PalmSource, Inc., Sunnyvale, CA (US)

( * ) Notice: Subject to any disclaimer, the term of this patent is extended or adjusted under 35 U.S.C. 154(b) by 499 days.

(21) Appl. No.: 09/770,070

(22) Filed: Jan. 24, 2001

(51) Int. Cl.
*H04M 3/00* (2006.01)
*H04L 12/28* (2006.01)
(52) U.S. Cl. .................. 455/420; 340/825.38
(58) Field of Classification Search ........... 455/405, 455/410, 404.1, 404.2, 423, 456.1, 457, 425, 455/346, 345, 466, 403, 420, 418, 417, 422.1, 455/41.2, 556.2, 343.4, 566, 343.2, 568; 340/825.7, 7.1, 825.36, 825.37, 825.49, 825.38; 348/734; 370/338, 825.36, 309.15; 379/103.1, 379/103.2; 700/65, 2, 86
See application file for complete search history.

(56) References Cited

U.S. PATENT DOCUMENTS

| 4,796,107 A | * | 1/1989 | Hiraki .......................... 386/83 |
| 5,532,754 A | * | 7/1996 | Young et al. .................... 725/47 |
| 5,657,317 A | * | 8/1997 | Mahany et al. ............... 370/338 |
| 5,742,905 A | * | 4/1998 | Pepe et al. ................... 455/461 |
| 6,034,621 A | * | 3/2000 | Kaufman ................ 340/825.44 |
| 6,118,926 A | * | 9/2000 | Kim et al. ...................... 386/83 |
| 6,295,448 B1 | * | 9/2001 | Hayes et al. ................. 455/420 |
| 6,298,218 B1 | * | 10/2001 | Lowe et al. .................... 455/66 |
| 6,308,083 B2 | * | 10/2001 | King ........................ 455/556.1 |
| 6,480,586 B1 | * | 11/2002 | Hayes et al. ........... 379/102.02 |
| 6,591,094 B1 | * | 7/2003 | Bentely ....................... 455/405 |
| 6,622,018 B1 | * | 9/2003 | Erekson ...................... 455/420 |
| 6,724,339 B2 | * | 4/2004 | Conway et al. ............. 341/176 |
| 6,801,787 B1 | * | 10/2004 | Page et al. ............... 455/556.1 |
| 6,829,478 B1 | * | 12/2004 | Layton et al. ............... 455/428 |
| 2002/0035404 A1 | * | 3/2002 | Ficco et al. .................... 700/65 |

* cited by examiner

*Primary Examiner*—Naghmeh Mehrpour
(74) *Attorney, Agent, or Firm*—Berry & Associates P.C.

(57) ABSTRACT

One embodiment in accordance with the present invention includes using a portable computing device to remotely control devices and/or systems wirelessly. Specifically, a software timer application operating on the portable computing device enables its user to predefine the time, date, and the operation(s) that one or more properly enabled devices and/or systems perform in the future. That is, the timer software operating on the portable computing device is able at some predefined time to wirelessly trigger an action or a sequence of actions from devices and/or systems. For example, a user of the portable computing device is able to utilize the timer software to program a predefined date and time that the portable computing device will turn on a favorite radio, program and turn up the thermostat. The wireless communication of the portable computing device may occur using a radio frequency (RF) technology like Bluetooth, IEEE 802.1 1, or HomeRF.

33 Claims, 9 Drawing Sheets

100a

100b

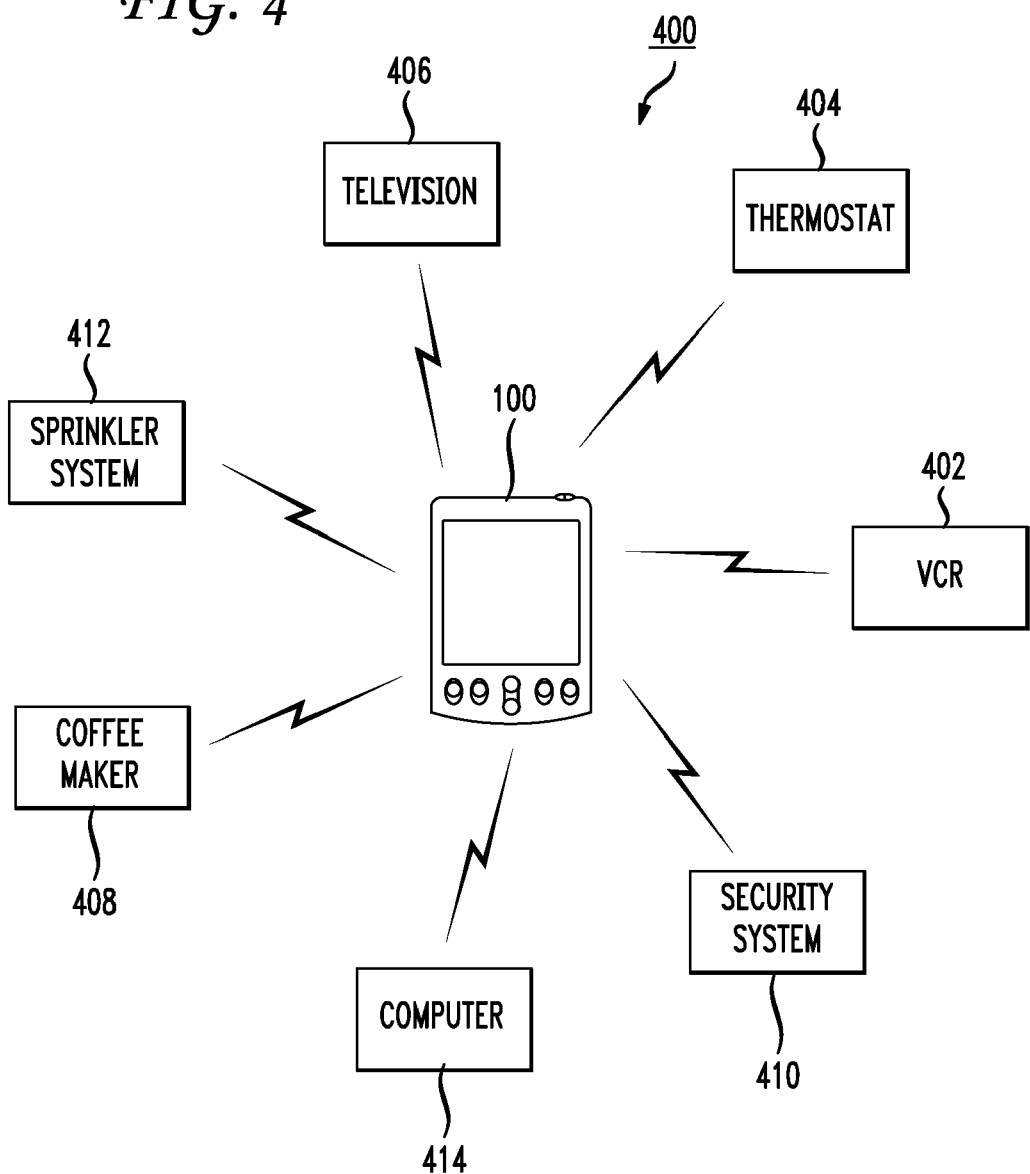

FIG. 5A

DEVICE SCHEDULE — 502

- DEVICE: LAWN SPRINKLERS — 504
- ACTION: TURN ON — 506
- TIME: 1:00pm – 2:00pm — 508
- DATE: Wed 7/19/00 — 510
- REPEAT: NONE — 512
- ALARM: NO — 514

( OK ) — 516  ( CANCEL ) — 518  ( DELETE... ) — 520

FIG. 5B

CHANGE REPEAT — 522

| NONE | DAY | WEEK | MONTH | YEAR | — 524

TAP ONE OF THE ABOVE BUTTONS TO SET A REPEAT INTERVAL.

NO REPEAT ( OK ) — 526  ( CANCEL ) — 528

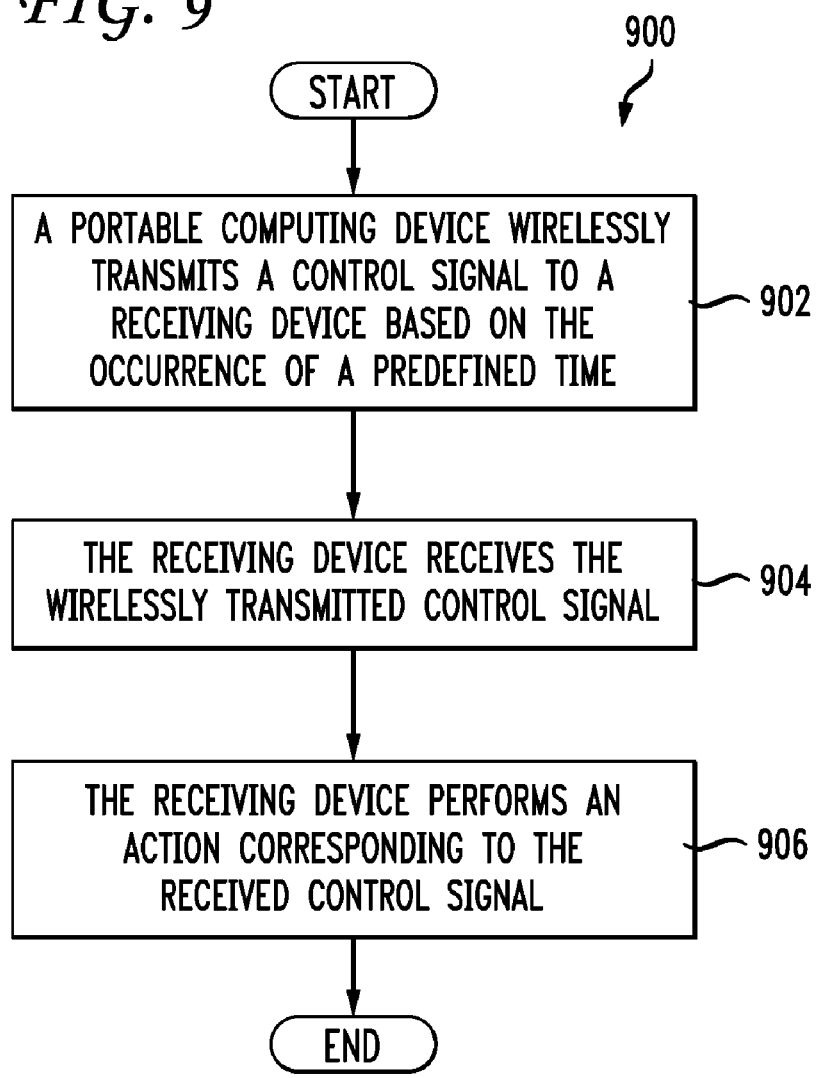

METHOD AND SYSTEM FOR ENABLING TIMED EVENTS OF A PORTABLE COMPUTING DEVICE TO TRIGGER REMOTE CONTROL OF EXTERNAL DEVICES

TECHNICAL FIELD

The present invention generally relates to the field of portable electronic devices. More particularly, the present invention relates to the field of personal digital assistants (PDAs) and other similar types of portable electronic devices.

BACKGROUND ART

Modern research and technology have provided society with a wide variety of electronic devices. It is appreciated that some of these modern electronic devices and systems are very powerful and useful to their users. For example, some of the electronic devices and systems which fall into this category include: computers which occupy large office space down to computers which are held in one's hand, satellites which orbit around the earth relaying a multitude of communication signals, global positioning system (GPS) devices capable of determining the specific locations of their users on the earth, cellular phones which enable their users to communicate wirelessly with other people, to name a few. Additionally, it is also appreciated that some modern electronic devices and systems also provide entertainment to their users. For instance, some of the electronic devices and systems which fall into this category include: portable and fixed radio receivers which provide their users music along with a wide array of different audio programming, video game consoles which challenge their users with varying situations within different virtual realities, portable and fixed compact disc (CD) players which provide music to their users, and televisions which provide a wide variety of visual and audio programming to their users.

Furthermore, there are some modern electronic devices and systems that have one or more time dependent operations. For instance, some of the electronic devices and systems which fall into this category include: video cassette recorders (VCRs), thermostats connected to heating and/or cooling systems, radios, ovens, televisions, coffee makers, microwave ovens, water sprinkler systems, and stereo systems to name a few. Specifically, video cassette recorders (VCRs) are able to be programmed to automatically turn on at a predetermined time on a specific day and begin recording a particular broadcast television show for a certain amount of time. Another example of a modern electronic device that may have a time dependent operation is a thermostat of a home heating and/or cooling system. Specifically, the thermostat may be programmed to automatically activate and/or deactivate a furnace in order to heat a home to a particular temperature at predetermined hours everyday.

It should be appreciated that there are disadvantages associated with modern electronic devices and systems that have one or more time dependent operations. For instance, if a person wants to program several different electronic devices and/or systems, that person typically has to physically move around to the location of each device and/or system. For example, a person is about to go on a vacation and he wants to program his house thermostat to a different setting, program his house lights to come on and off automatically, program his lawn sprinklers to a different cycle, and program his VCR to record some of his favorite broadcast television shows. Unfortunately, in order to do all of this programming, he has to typically move around his house to each device and system. This situation becomes even more of a disadvantage when the person does not have much time to do this programming because he is in a hurry to go somewhere or do something else.

Another disadvantage associated with modern electronic devices and systems having one or more time dependent operations is that they are each typically programmed in a different manner. For example, a stereo system, thermostat, VCR, coffee maker, and water sprinkler system are each programmed in a different manner. As such, if a user wants to program all of these different electronic devices and systems, he or she has to learn each of the different ways to program them. Therefore, a user may become overwhelmed by all of the different ways of programming different electronic devices and systems.

DISCLOSURE OF THE INVENTION

Accordingly, what is needed is a method and system for providing a standard, easy-to-use, portable master control device (e.g., personal digital assistant) for controlling different types of electronic devices and systems having one or more time dependent operations. The present invention provides a method and system which accomplishes the above mentioned needs.

For example, one embodiment in accordance with the present invention includes using a portable computing device (e.g., personal digital assistant) to remotely control devices and/or systems wirelessly. Specifically, a software timer application operating on the portable computing device enables its user to predefine the time, date, and the operation(s) that one or more properly enabled devices and/or systems will perform in the future. That is, the software timer application operating on the portable computing device is able at some predefined time to wirelessly trigger an action or a sequence of actions from devices and/or systems. For example, a user of the portable computing device is able to utilize the timer software to program a predefined date and time that the portable computing device will turn on a favorite radio or television program, turn up the thermostat, and cause a computer to download the morning news, weather, stock reports, and traffic reports. The wireless communication between the portable computing device and the devices and/or systems may occur using a radio frequency (RF) technology like Bluetooth, IEEE 802.11, or HomeRF.

In another embodiment, the present invention includes a method for remotely controlling a device wirelessly with a portable computing device. Specifically, the method includes the step of utilizing a portable computing device to wirelessly transmit a control signal based on an occurrence of a predefined time. Additionally, the method includes the step of utilizing a device to wirelessly receive the control signal. Furthermore, the method includes the step of the device performing an action corresponding to the control signal.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 4 is a block diagram of an exemplary system wherein portable computing device of FIG. 1 is able to operate in accordance with one embodiment of the present invention.

FIG. 5A illustrates one embodiment of a "Device Schedule" screen shot produced by the software timer application in accordance with the present invention.

FIG. 5B illustrates one embodiment of the "Change Repeat" screen shot produced by the software timer application in accordance with the present invention.

FIG. 9 is a flowchart of steps performed in accordance with one embodiment of the present invention.

Figure 1:
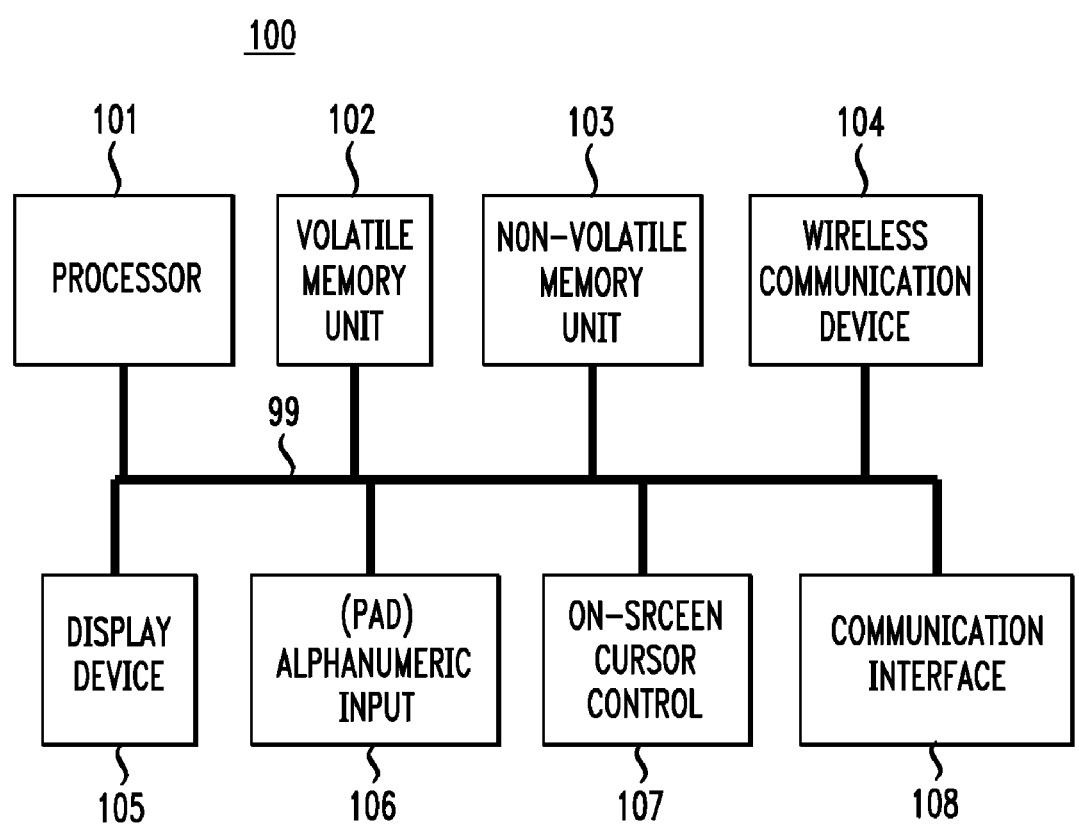
FIG. 1 illustrates circuitry of an exemplary portable computing device in accordance with one embodiment of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing", "outputting", "generating", "receiving", "transmitting", "determining", "using" or the like, refer to the actions and processes of a computer system, or similar electronic device including a personal digital assistant (PDA). The computer system or similar electronic computing device manipulates and transforms data represented as physical (electronic) quantities within the computer system's registers and memories into other data similarly represented as physical quantities within the computer system memories or registers or other such information storage, transmission, or display devices.

EXEMPLARY PORTABLE COMPUTING DEVICE

With reference now to FIG. 1, it should be appreciated that portions of the present method and system are comprised of computer-readable and computer-executable instructions which reside, for example, in computer-usable media of a portable computer system. FIG. 1 illustrates an exemplary portable computer system 100. It is appreciated that system 100 of FIG. 1 is only exemplary and that the present invention can operate within a number of different portable computing devices, personal digital assistants (PDAs), pager, portable telephone, and the like.

FIG. 1 illustrates circuitry of an exemplary portable computing device 100 in accordance with one embodiment of the present invention. Portable computer system 100 includes an address/data bus 99 for communicating information, a central processor 101 coupled with the bus 99 for processing information and instructions, a volatile memory unit 102 (e.g., random access memory, static RAM, dynamic RAM, etc.) coupled with the bus 99 for storing information and instructions for the central processor 101 and a non-volatile memory unit 103 (e.g., read only memory, programmable ROM, flash memory, EPROM, EEPROM, etc.) coupled with the bus 99 for storing static information and instructions for the processor 101. Computer system 100 also includes a wireless communication device 104 coupled to the bus 99 for wirelessly transmitting and receiving information from other devices. It should be understood that wireless communication device 104 may include radio frequency (RF) technology such as Bluetooth communication technology, IEEE 802.11 technology, or HomeRF technology. Wireless communication device 104 can also include an infrared communication port. System 100 also contains a display device 105 coupled to the bus 99 for displaying information to the portable computer user.

Also included in portable computer device 100 of FIG. 1 is an optional alphanumeric input device 106 which in one implementation is a handwriting recognition pad ("digitizer") having different regions, for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where a stylus makes contact. The display device 105 utilized with the computer system 100 may be a liquid crystal device (LCD), cathode ray tube (CRT), field emission device (FED, also called flat panel CRT), plasma, or other display device suitable for creating graphic images and alphanumeric characters recognizable to the user. Portable computer system 100 also includes a communication interface 108, which is also coupled to bus 99, and can be a serial port for communicating with a cradle (not shown) for system 100.

Figure 2A:
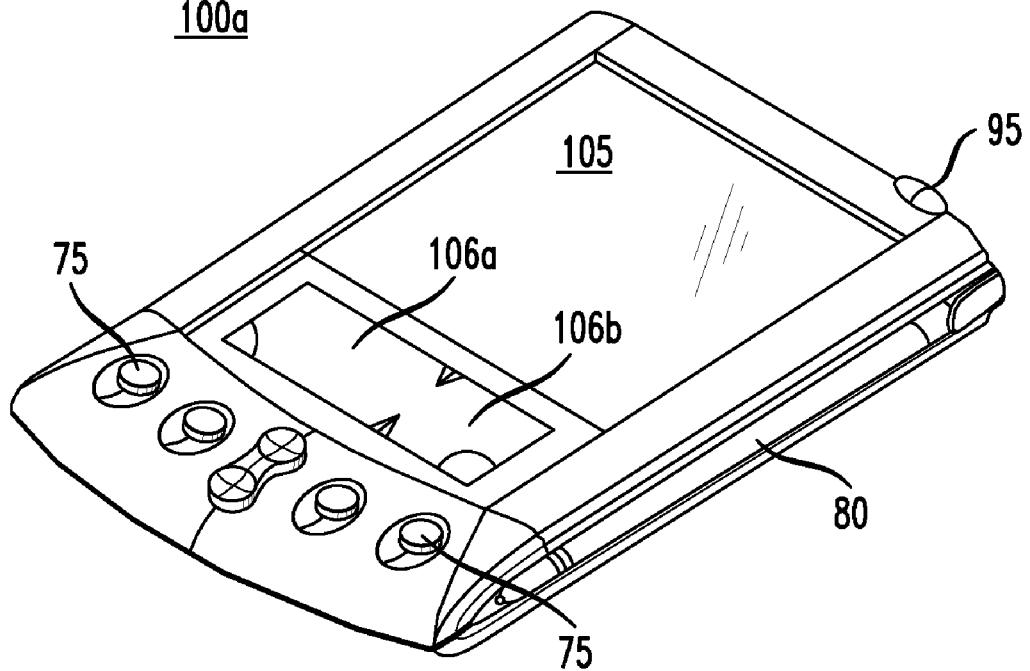
FIG. 2A is a perspective illustration of the top face of one embodiment of the portable computing device of FIG. 1.

FIG. 2A is a perspective illustration of the top face 100a of one embodiment of portable computing device 100. The top face 100a contains the display screen 105 surrounded by a bezel or cover. A removable stylus 80 is also shown. The display screen 105 is a touch screen capable of registering contact between the screen and the tip of a stylus 80. The stylus 80 can be fabricated of any material which can make contact with the screen 105. The top face 100a also contains one or more dedicated and/or programmable buttons 75 for selecting information and causing the computer system 100 to implement functions. The on/off button 95 is also shown.

FIG. 2A also illustrates a handwriting recognition pad or "digitizer" containing regions 106a and 106b. Specifically, region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to the internal processor 101 for automatic character recognition. Once characters are recognized, they are typically displayed on the screen 105 for verification and/or modification.

Figure 2B:
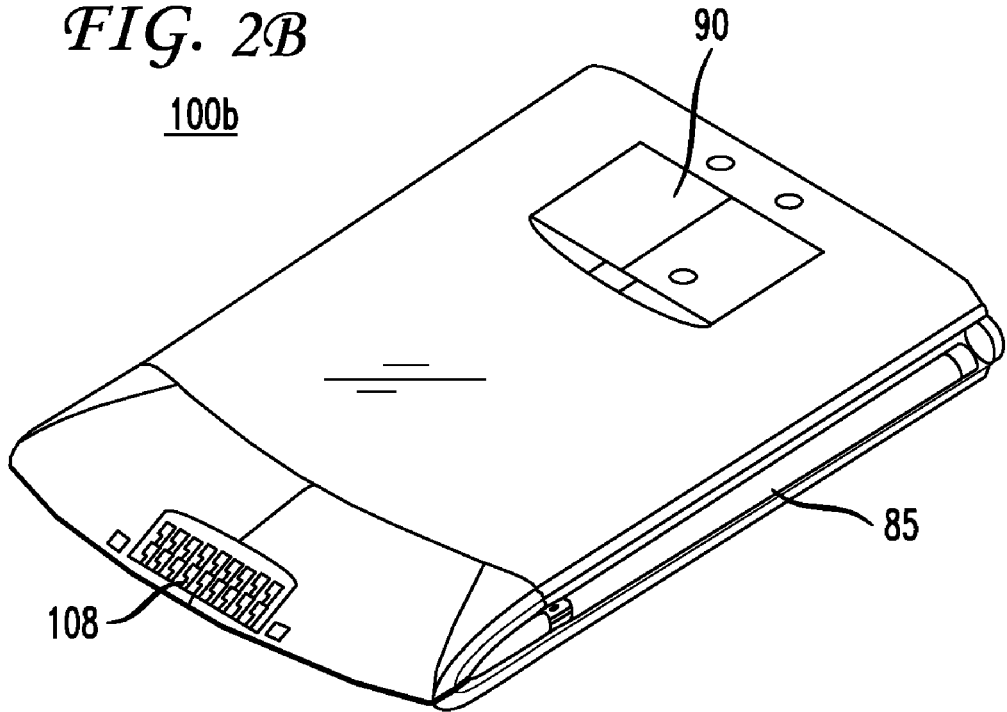
FIG. 2B is a perspective illustration of the bottom side of one embodiment of the portable computing device of FIG. 1.

FIG. 2B is a perspective illustration of the bottom side 100b of one embodiment of the portable computing device 100. An optional extendible antenna 85 is shown and also a battery storage compartment door 90 is shown. The communication interface 108 is also shown. In one embodiment of the present invention, the communication interface 108 is a serial communication port, but could also alternatively be of any of a number of well known communication standards and protocols, e.g., parallel, small computer system interface (SCSI), Ethernet, FireWire (IEEE 1394), Universal Serial Bus (USB), etc.

Figure 3:
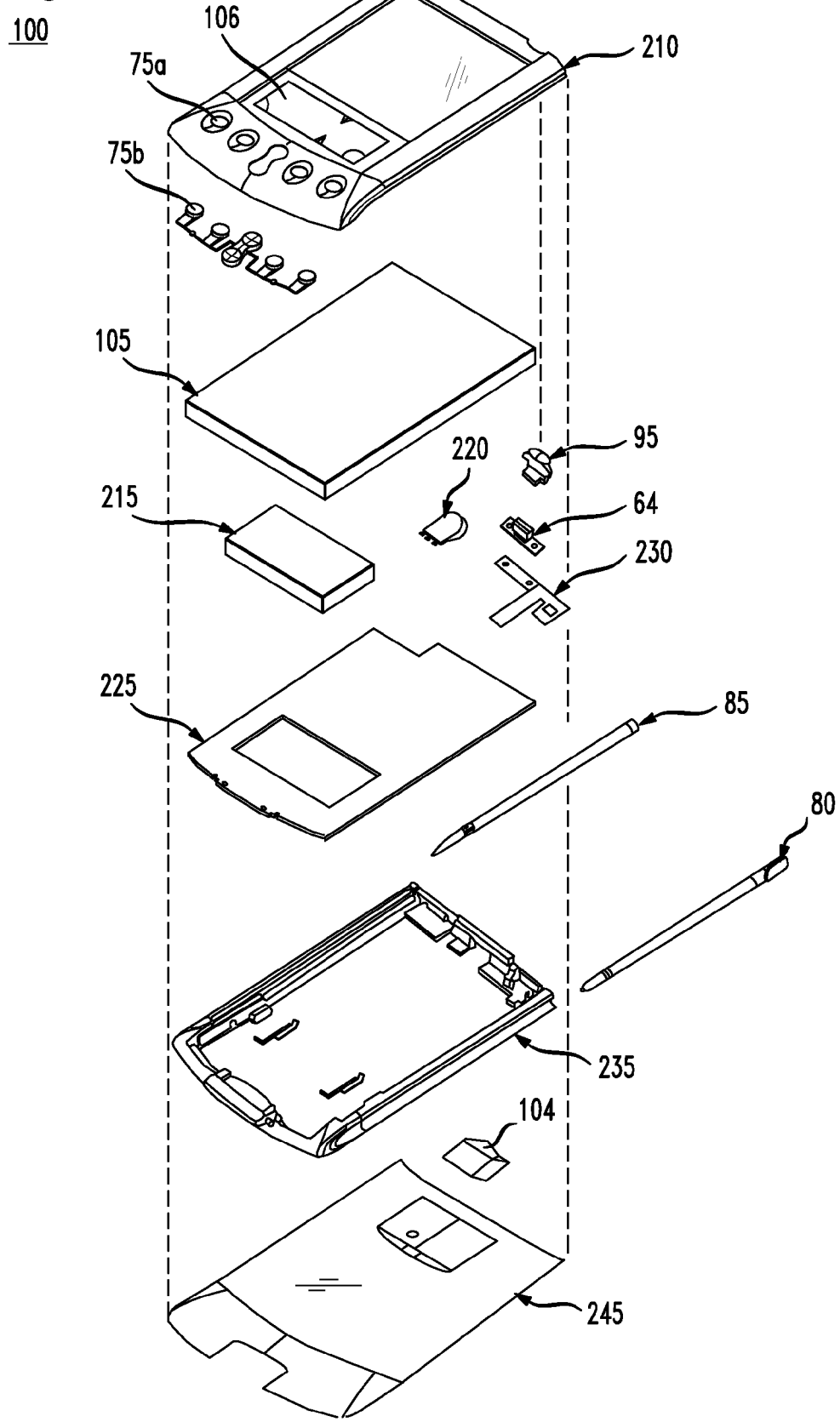
FIG. 3 is an exploded view of the components of one embodiment of the portable computing device of FIGS. 2A and 2B.

FIG. 3 illustrates an exploded view of one embodiment of portable computing device 100. System 100 contains a front cover 210 having an outline of region 106 and holes 75a for receiving buttons 75b. A flat panel display 105 (both liquid crystal display and touch screen) fits into front cover 210. A battery 215 provides electrical power. A contrast adjustment (potentiometer) 220 is also shown. On/off button 95 is shown along with an infrared emitter and detector device 64. A flex circuit 230 is shown along with a printed circuit (PC) board 225 containing electronics and logic (e.g., processor 101, communication bus 99, volatile memory unit 102, and non-volatile memory unit 103) for implementing computer system functionality. A midframe 235 is shown along with stylus 80. Position adjustable antenna 85 is also shown. A wireless receiver/transmitter device 104 is also shown between the midframe and the rear cover 245. The receiver/transmitter device 104 may be coupled to the antenna 85 and also coupled to communicate with the PC board 225. As previously mentioned, wireless communication device 104 may include radio frequency (RF) technology such as Bluetooth communication technology, IEEE 802.11, or HomeRF.

EXEMPLARY EMBODIMENTS OF THE PRESENT INVENTION

FIG. 4 is a block diagram of an exemplary system 400 wherein portable computing device 100 is able to operate in accordance with an embodiment of the present invention. Within the present embodiment, portable computing device 100 is utilized to remotely control a VCR 402, a thermostat 404, a television 406, a coffee maker 408, a security system 410, a sprinkler system 412, and a computer system 414 wirelessly. The portable computing device 100 may be implemented with a software timer application in accordance with the present embodiment that enables a user of computer 100 to predefine the time, date, and the operation(s) that one or more of devices and systems 402-414 will perform in the future. Specifically, the software timer application operating on portable computing device 100 is able at some predefined time to wirelessly trigger an action or a sequence of actions from the devices and systems 402-414. For example, a user of portable computing system 100 utilizes the timer software to program a predefined date and time that device 100 will wirelessly turn on the television 406, increase the temperature setting of the thermostat 404, and turn off the home security system 410.

More specifically, portable computing device 100 is able to communicate wirelessly with VCR 402, thermostat 404, television 406, coffee maker 408, security system 410, sprinkler system 412, and computer system 414. It is understood that the wireless communication of system 400 may occur using a radio frequency (RF) technology like Bluetooth communication technology, IEEE 802.11, or HomeRF. Furthermore, VCR 402, thermostat 404, television 406, coffee maker 408, security system 410, sprinkler system 412, and computer system 414 may be enabled with software and/or hardware which recognizes instructions and/or control signals received from portable computing device 100 via wirelessly communication.

Within the present embodiment of FIG. 4, the software timer application operating on portable computing device 100 provides its user a way to control VCR 402, thermostat 404, television 406, coffee maker 408, security system 410, sprinkler system 412, and computer system 414. Specifically, the software timer application enables a user to schedule when portable computing device 100 should trigger an action or a sequence of actions in one or more of the devices and systems 402-414. As such, it is understood that the software timer application of the present embodiment may operate in conjunction with a clock that keeps track of the current date and time. Furthermore, the software timer application enables a user to set the duration of each scheduled action. Moreover, the software timer application enables a user to set a repeat interval for each scheduled action. That is, it may be desirable for a scheduled action to recur at a regular interval of time (e.g., daily, weekly, monthly, yearly, and the like). For example, the user may want portable computing device 100 to cause the lawn sprinkler system 412 to be turned on for a duration of an hour each week.

Specifically, by utilizing the timer software, a user of portable computing device 100 may schedule it to cause sprinkler system 412 to turn on at 6 AM and turn off at 7 AM every Wednesday. As such, when an internal clock of portable computing device 100 reaches 6 AM, the timer software application causes portable computing device 100 to transmit a wireless signal (e.g., via Bluetooth technology) to sprinkler system 412 which will cause it to be activated. Upon reception of the wireless activation signal, the sprinkler system 412 activates itself and begins watering a lawn. Subsequently, when the internal clock of portable computing device 100 reaches 7 AM, the timer software application causes portable computing device 100 to transmit another wireless signal to sprinkler system 412 which will cause it to become deactivated. Upon reception of the wireless deactivation signal, the sprinkler system 412 deactivates itself thereby discontinuing the process of watering the lawn. It is appreciated that this process of turning on and turning off of sprinkler system 412 may occur every Wednesday if portable computing device 100 is within the reception range of sprinkler system 412. For example, portable computing device 100 may have a transmission range of about 10 meters if it is utilizing Bluetooth technology to communicate. However, this range may be reduced if there are walls or other obstacles located between the portable computing device 100 and the receiving device of the sprinkler system 412.

Referring still to FIG. 4, it is understood that each one of VCR 402, thermostat 404, television 406; coffee maker 408, security system 410, and computer system 414 may be wirelessly controlled by portable computing device 100 in a manner similar to the sprinkler system 412, described above.

The timer software application of the present embodiment may utilize some of the functionality of a Date Book program typically found on a personal digital assistant (e.g., Palm® hand-held device). Furthermore, the timer software application may include a function where it can alarm a user of portable computing device 100 that it is about to trigger a scheduled action. At this point, the user is able to determine whether he or she wants to allow the scheduled action to occur. If not, the user is able to cancel the scheduled action. Conversely, if the user does not want to cancel the scheduled action, he or she may do nothing thereby allowing the scheduled action to occur.

With reference still to FIG. 4, it should be noted that VCR 402, thermostat 404, television 406, coffee maker 408, security system 410, sprinkler system 412, and computer system 414 may also be enabled to transmit one or more wireless communication signals to portable computing device 100. For example, upon reception of an activation or deactivation signal, any of these devices and systems 402-414 may wirelessly transmit an acknowledgment signal to portable computing device 100. As such, the timer software operating on portable computing device 100 is able to know (for example) that the desired device and/or system received the transmitted signal(s). Furthermore, each of devices and systems 402-414 may be enabled to wirelessly transmit status information to portable computer 100 thereby updating its timer software as to the particular function, operation, or action currently being or having been performed.

It should be understood that there are many different ways in accordance with the present embodiment that a user of portable computer 100 may schedule an occurrence of one or more actions for devices and/or systems 402-414 utilizing the software timer application. For example, FIG. 5A illustrates one embodiment of a standardized "Device Schedule" screen shot 502 (that appears on display 105) produced by the software timer application in accordance with the present invention which may be utilized by a user of portable computer 100 to schedule one or more actions for devices and/or systems 402-414. Specifically, at a "Device" box 504, the user of portable computer 100 may manually enter (or select from a predefined list) the desired device or system (e.g., lawn sprinkler 412) to control. Next, at an "Action" box 506, the user of portable computer 100 may manually enter (or select from a predefined list) the desired action (e.g., turn on, turn off, start or stop recording, increase or decrease temperature, and the like) to occur in the future.

Additionally, at a "Time" box 508 of FIG. 5A, the user of portable computer 100 may manually enter (or select from predefined times) the beginning time and ending time of the scheduled action. As such, the duration of the scheduled action is established within "Time" box 508. At a "Date" box 510, the user of portable computer 100 may manually enter (or select from a predefined calendar) the date that the scheduled action should begin and/or occur. At a "Repeat" box 512, the user of portable computer 100 may manually initiate a change to the repeat cycle. The functionality of "Repeat" box 512 is described in more detail below. Next, at an "Alarm" box 514, the user of portable computer 100 may manually enter (or select from a predefined list) whether to be alarmed before the timer software triggers the scheduled action. In this manner, the user of portable computing device 100 is provided the ability to cancel or change the start time of the scheduled action. Upon completion of device schedule 502, the user of portable computer 100 can tap on an "OK" button 516 which causes the entered device schedule information to be stored and utilized by the timer software application of portable computer 100. It is appreciated that a "Cancel" button 518 may also be utilized by the user of portable computing device 100 to cancel a device schedule which may not be completed while a "Delete" button 520 may be utilized by the user to delete a completed device schedule.

As previously mentioned, it may be desirable for a scheduled action to recur at a regular interval of time. As such, the user of portable computer 100 is able to initiate a change to the repeat cycle by tapping on the "Repeat" box 512 which causes the "Change Repeat" screen shot 522 of FIG. 5B to appear on display 105 of portable computing device 100. Specifically, FIG. 5B illustrates one embodiment of the "Change Repeat" screen shot 522 produced by the software timer application in accordance with the present invention which may be utilized by a user of portable computer 100 to change when (and if) a scheduled action is to recur at a regular interval of time (e.g., daily, weekly, monthly, yearly, and the like). At a time interval box 524, the user of portable computer 100 may manually choose how often (if at all) the schedule action repeats. For example, if the user selects the "Day" within the time interval box 524 by tapping on it, the scheduled action will repeat every day.

Still referring to FIG. 5B, it should be appreciated that other screen shots may be shown on display screen 105 thereby enabling the user to more specifically schedule regular intervals of time (e.g., every other day, every other week, every other month, and the like). That is, the "Change Repeat" screen shot 522 of the present embodiment is well suited to be implemented in a wide variety of ways in order to specify any type of regular interval of time. Upon completion of "Change Repeat" 502, the user of portable computer 100 can tap on an "OK" button 526 which causes the entered repeat information to be stored and utilized by the timer software application of portable computer 100. It is appreciated that a "Cancel" button 528 may be utilized by the user of portable computing device 100 to cancel a "Change Repeat" schedule 522 which may not be completed or is already set up properly.

Figure 6:
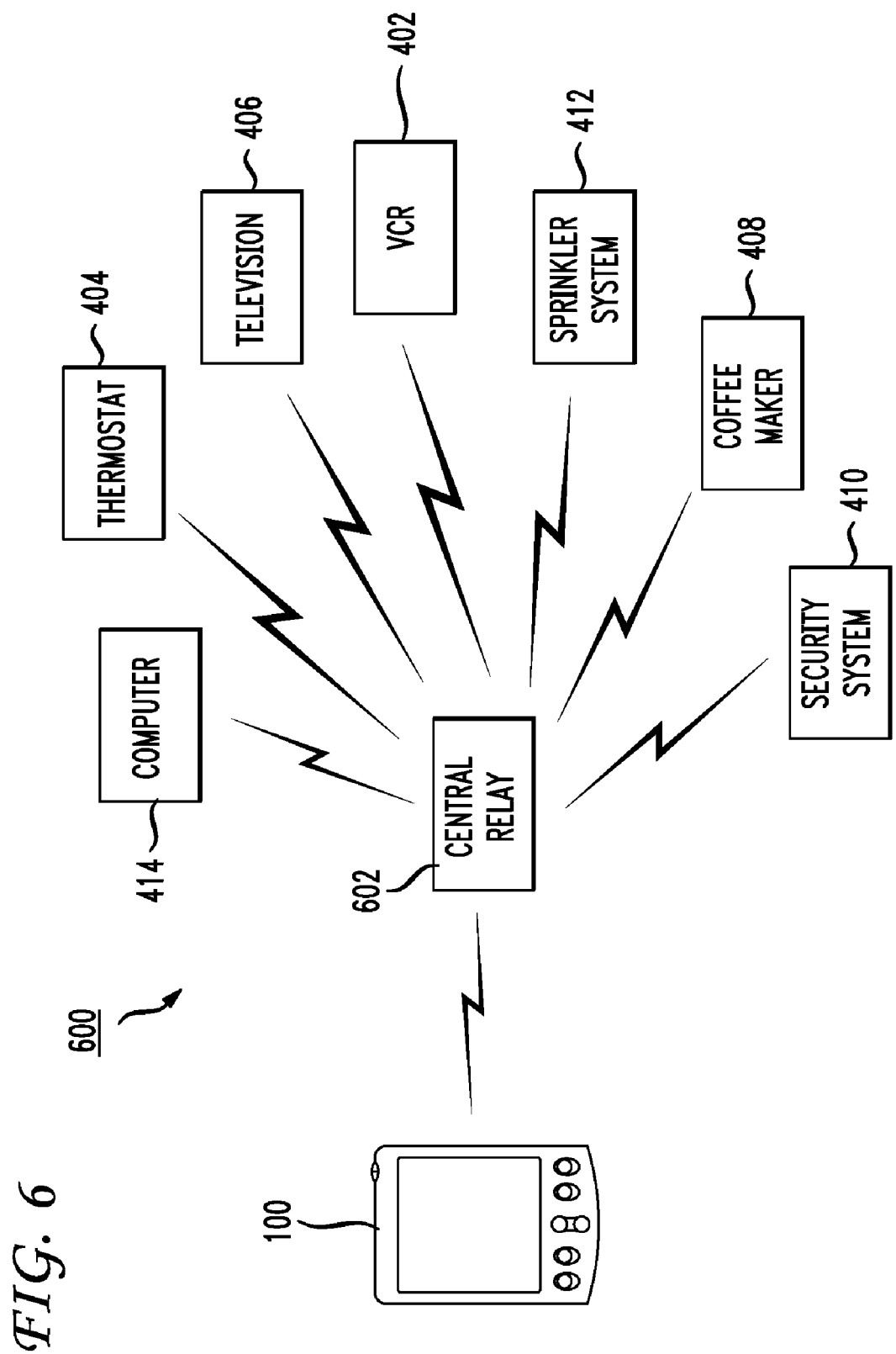
FIG. 6 is a block diagram of another exemplary system wherein portable computing device is able to operate in accordance with an embodiment of the present invention.

FIG. 6 is a block diagram of an exemplary system 600 wherein portable computing device 100 is able to operate in accordance with an embodiment of the present invention. It is appreciated that system 600 operates in a manner similar to system 400 of FIG. 4. However, system 600 includes a central relay device 602 which is enabled to receive and retransmit any signals wirelessly transmitted by portable computing device 100 and the devices and systems 402-414. As such, central relay 602 is able to extend the effective communication range between portable computing device 100 and the devices and systems 402-414. It should be appreciated that if central relay device 602 is enabled with Bluetooth communication technology, it is able to communication wirelessly up to a range of substantially 100 meters because it is a higher power device than a typical portable computing device 100. However, this range may be reduced if there are walls or obstacles located between central relay 602 and portable computing device 100 or the devices and systems 402-414.

It should be noted that central relay device 602 of the present embodiment may be implemented in a wide variety of locations. For example, central relay 602 may be implemented within a house, office space, any type of transportation vehicle, and the like. Furthermore, the present embodiment is well suited to have more than one central relay device (e.g., 602). In this manner, the multiple central relay devices (e.g., 602) are able to extend the effective communication range between portable computing device 100 and the devices and systems 402-414. For example, a central relay device (e.g., 602) may be implemented within an automobile while another central relay device (e.g., 602) may be implemented within a house. As such, if the portable computer 100 is located in the automobile, it may wirelessly transmit a control signal which is received and retransmitted by the automobile central relay device (e.g., 602). The house central relay device (e.g., 602) receives and retransmits the control signal to the devices and systems 402-414. Therefore, one or more of the devices and systems 402-414 then perform the desired action corresponding to the received control signal.

Figure 7:
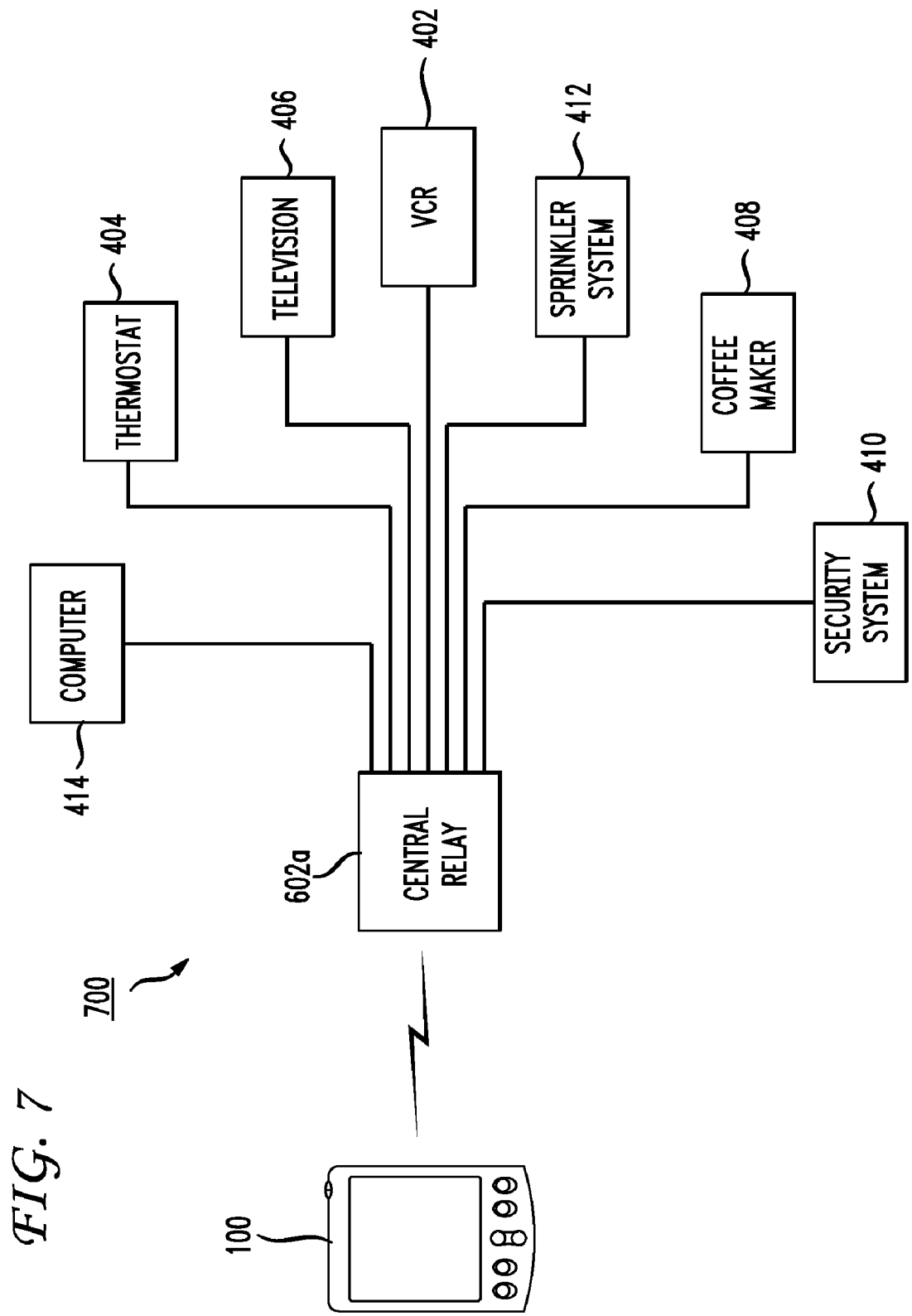
FIG. 7 is a block diagram of yet another exemplary system wherein portable computing device is able to operate in accordance with an embodiment of the present invention.

FIG. 7 is a block diagram of an exemplary system 700 wherein portable computing device 100 is able to operate in accordance with an embodiment of the present invention. It is appreciated that system 700 operates in a manner similar to system 600 of FIG. 6. However, central relay device 602a is physically coupled to VCR 402, thermostat 404, television 406, coffee maker 408, security system 410, sprinkler system 412, and computer system 414. Within the present embodiment, central relay 602a may be coupled to VCR 402, thermostat 404, television 406, coffee maker 408, security system 410, sprinkler system 412, and computer system 414 in a wide variety of ways. For example, central relay 602a may be coupled to VCR 402, thermostat 404, television 406, coffee maker 408, security system 410, sprinkler system 412, and computer system 414 via coaxial cable, copper wire, fiber optics, and the like.

Specifically, central relay 602a may be enabled to wirelessly receive signals from portable computing device 100 and then retransmit them to the device and/or system (e.g., 402-414) that the received signal is specifically intended for. Furthermore, central relay 602a may be enabled to receive communication signals from any of the devices and systems 402-414 and then wirelessly transmit them to portable computer 100. As such, central relay 602a is able to extend the effective communication range between portable computing device 100 and the devices and systems 402-414. It should be appreciated that if central relay 602a is enabled with Bluetooth communication technology, it is able to wirelessly communicate with portable computing device 100 up to a range of substantially 100 meters. However, this range may be reduced if there are walls or obstacles located between central relay 602a and portable computing device 100.

The present embodiment of FIG. 7 is well suited to have more than one central relay device (e.g., 602a). Furthermore, the present embodiment is well suited to utilize both central relay devices 602a (of FIG. 7) and 602 (of FIG. 6). In this manner, central relay device 602 is able to extend the effective communication range between portable computing device 100 and the devices and systems 402-414. For example, central relay device 602 may be located between portable computing device 100 and central relay device 602a. As such, when the portable computer 100 wirelessly transmits a control signal, it is received and retransmitted by central relay device 602. The central relay device 602a (FIG. 7) receives and retransmits the control signal to the device and/or system (e.g., 402-414) that the received signal is specifically intended for. Therefore, one or more of the devices and systems 402-414 then perform the desired action corresponding to the received control signal.

Figure 8:
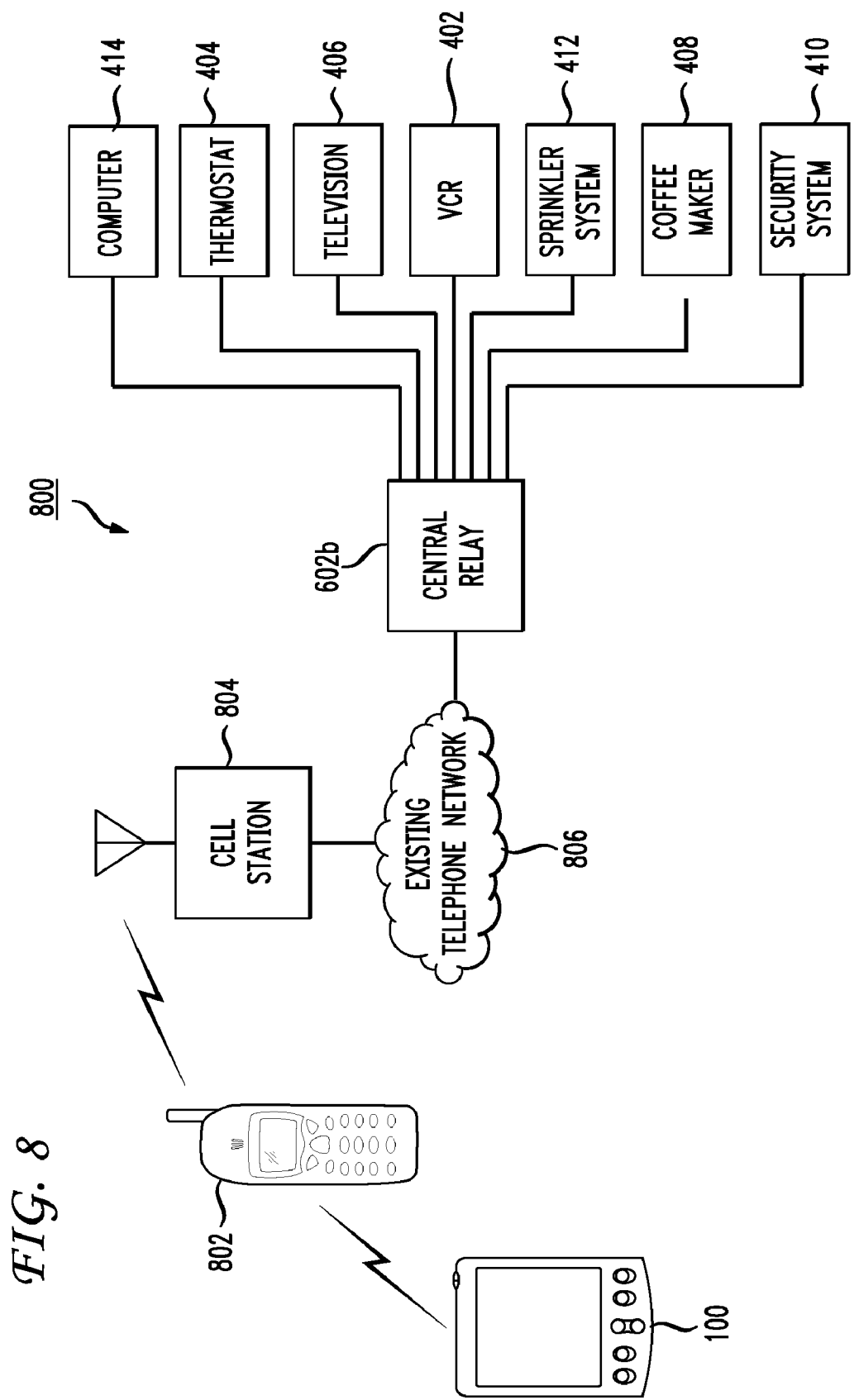
FIG. 8 is a block diagram of still yet another exemplary system wherein portable computing device is able to operate in accordance with an embodiment of the present invention.

FIG. 8 is a block diagram of an exemplary system 800 wherein portable computing device 100 is able to operate in accordance with an embodiment of the present invention. Within the present embodiment, portable computing device 100 is able to remotely control one or more of the devices and systems 402-414 from great distances (e.g., thousands of miles). For example, portable computing device 100 wirelessly transmits a control signal that is received by a cell phone 802 which is able to wirelessly communicate with portable computer 100. Cell phone 802 understands that the received control signal is for one or more of the devices and systems 402-414. As such, cell phone 802 establishes a communication link with central relay device 602b via a cell station 804 and an existing telephone network 806. Then the cell phone 802 wirelessly transmits the received control signal which is received by cell station 804. The cell station 804 transmits the control signal to central relay device 602b via the existing telephone network 806. The central relay device 602b receives the control signal and retransmits it to the device and/or system (e.g., 402-414) that the received control signal is specifically intended for.

Within the present embodiment, central relay device 602b is physically coupled to the existing telephone network 806, VCR 402, thermostat 404, television 406, coffee maker 408, security system 410, sprinkler system 412, and computer system 414. However, central relay 602b of the present embodiment may be coupled to the existing telephone network 806, VCR 402, thermostat 404, television 406, coffee maker 408, security system 410, sprinkler system 412, and computer system 414 in a wide variety of ways. For example, central relay 602a may be coupled to the existing telephone network 806, VCR 402, thermostat 404, television 406, coffee maker 408, security system 410, sprinkler system 412, and computer system 414 via coaxial cable, copper wire, fiber optics, wireless communication, and the like. It should be noted that if central relay device 602b utilizes wireless communication, it may operate in a manner similar to central relay 602 (FIG. 6) or central relay 602a (FIG. 7).

Referring still to FIG. 8, it is appreciated that portable computing device 100 may be coupled to central relay 602b in a wide variety of ways in accordance with the present embodiment. For example, instead of cell station 804 being coupled to central relay 602b via the existing telephone network 806, cell station 804 may be coupled to central relay 602b via the Internet (not shown). Furthermore, the existing telephone network 806 and central relay 602b may be coupled via the Internet. As such, portable computing device 100 may be coupled to central relay 602b utilizing wireless communication and any other combination of wireless and wired communication technologies.

FIG. 9 illustrates a flowchart 900 of steps performed in accordance with one embodiment of the present invention for enabling a portable computing device to remotely control a receiving device based on the occurrence of a predefined time.

Flowchart 900 includes processes of the present invention which, in one embodiment, are carried out by processor(s)

and electrical components under the control of computer readable and computer executable instructions. Some or all of the computer readable and computer executable instructions may reside, for example, in data storage features such as computer usable volatile memory unit 102 and/or computer usable non-volatile memory unit 103 of FIG. 1. However, the computer readable and computer executable instructions may reside in any type of computer readable medium. Although specific steps are disclosed in flowchart 900, such steps are exemplary. That is, the present invention is well suited to performing various other steps or variations of the steps recited in FIG. 9. Within the present embodiment, it should be appreciated that the steps of flowchart 900 can be performed by software or hardware or any combination of software and hardware.

At step 902, a portable computing device (e.g., 100) wirelessly transmits (e.g., via Bluetooth communication technology, IEEE 802.11, or HomeRF) a control signal to a receiving device and/or system (e.g., 402-414) based on the occurrence of a predefined time. It is appreciated that a user of the portable computing device may have scheduled the predefined time. In step 904, the receiving device receives the wirelessly transmitted control signal via wireless communication technology (e.g., Bluetooth technology, IEEE 802.11, or HomeRF). At step 906, the receiving device performs an action, an operation, and/or a function which corresponds to the received control signal. At the completion of step 906, the present embodiment exits flowchart 900.

Accordingly, the present invention provides a method and system for providing a standard, easy-to-use, portable master control device (e.g., personal digital assistant) for controlling different types of electronic devices and systems having one or more time dependent operations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A personal digital assistant comprising:
a processor;
a memory unit to store instructions for the processor;
a wireless communications device to wirelessly transmit a control signal;
an internal clock integrated within said personal digital assistant;
a display device; and
a bus coupled to the processor, the memory unit, the wireless communications device, and the display device to communicate information, wherein:
the personal digital assistant is configured to:
display a device schedule menu, via the display device, to permit a user to directly select an external device via the device schedule menu for which operation of the external device is to be controlled in accordance with time data directly entered via the device schedule menu;
notify said user via alarm of an impending action at a first time corresponding to the time data; and
wirelessly transmit via the wireless communications device, at said first time corresponding to the time data, a control signal to cause the device to perform a first action, said first time indicated by said internal clock.

2. The personal digital assistant of claim 1, wherein the personal digital assistant is further configured to receive, via the wireless communications device, a signal from the external device in response to the external device receiving the control signal from the personal digital assistant.

3. The personal digital assistant of claim 2, wherein the signal received via the wireless communications device is an acknowledgement from the external device.

4. The personal digital assistant of claim 2, wherein the signal received via the wireless communications device includes status information from the external device.

5. The personal digital assistant of claim 1, wherein the personal digital assistant is further configured to:
wirelessly transmit via the wireless communications device, at a second time corresponding to the time data, a second control signal to cause the external device to perform a second action.

6. The personal digital assistant of claim 1, wherein the first action includes one of activating the external device, deactivating the external device, or adjusting a setting of the external device.

7. The personal digital assistant of claim 1, wherein the personal digital assistant is configured to:
permit a user to enter data to the device schedule menu for controlling operation of a plurality of external devices, the operation of each of the plurality of external devices to be controlled in accordance with respective time data entered via the device schedule menu for a corresponding one of the plurality of external devices.

8. The personal digital assistant of claim 1, wherein the personal digital assistant is further configured to:
permit a user to enter a regular time period for the personal digital assistant to wirelessly retransmit, via the wireless communications device, the control signal to cause the external device to perform the first action.

9. The personal digital assistant of claim 1, wherein the personal digital assistant is further configured to:
wirelessly transmit, via the wireless communications device, the control signal through a cell phone to the external device.

10. The personal digital assistant of claim 1, wherein the personal digital assistant is further configured to:
wirelessly transmit, via the wireless communications device, the control signal through a relay to the external device.

11. The personal digital assistant of claim 1, wherein the personal digital assistant is further configured to:
alarm before wirelessly transmitting the control signal; and
permit a user to cancel the wireless transmitting of the control signal before the control signal is wirelessly transmitted after the alarming.

12. A machine-readable medium having instructions recorded therein for at least one processor, said at least one processor having an integrated internal clock, the machine-readable medium comprising:
instructions for displaying a device schedule menu to permit a user to directly select an external device via the device schedule menu for which operation of the external device is to be controlled in accordance with time data directly entered via the device schedule menu, and
instructions for notifying said user via alarm of an impending action at a first time corresponding to the time data; and instructions for wirelessly transmitting, at a first time corresponding to the time data, a control signal to cause the device to perform a first action, said first time indicated by said integrated internal clock.

13. The machine-readable medium of claim 12 further comprising:
instructions for receiving a signal from the external device in response to the device receiving the control signal.

14. The machine-readable medium of claim 13, wherein the signal is an acknowledgment from the external device.

15. The machine-readable medium of claim 13, wherein the signal includes status information from the external device.

16. The machine-readable medium of claim 12 further comprising:
instructions for wirelessly transmitting, at a second time corresponding to the time data, a second control signal to cause the external device to perform a second action.

17. The machine-readable medium of claim 12, wherein the first action includes one of activating the external device, deactivating the external device, or adjusting a setting of the external device.

18. The machine-readable medium of claim 12 further comprising:
instructions for permitting a user to enter data to the external device schedule menu for controlling operation of a plurality of external devices, the operation of each of the plurality of external devices to be controlled in accordance with respective time data entered via the device schedule menu for a corresponding one of the plurality of external devices.

19. The machine-readable medium of claim 12 further comprising:
instructions for permitting a user to enter a regular time period for wirelessly retransmitting the control signal to cause the external device to perform the first action.

20. The machine-readable medium of claim 12 further comprising:
instructions for wirelessly transmitting the control signal through a cell phone to the external device.

21. The machine-readable medium of claim 12 further comprising:
instructions for wirelessly transmitting the control signal through a relay to the external device.

22. The machine-readable medium of claim 12 further comprising:
instructions for alarming before wirelessly transmitting the control signal; and instructions for permitting a user to cancel the wireless transmitting of the control signal before the control signal is wirelessly transmitted after the alarming.

23. A method comprising:
displaying a device schedule menu, on a portable handheld device, to permit a user to directly select a second device via the device schedule menu for which operation of the second device is to be controlled in accordance with time data directly entered via the device schedule menu, said portable handheld device having an internal clock;
notifying said user via alarm of an impending action at a first time corresponding to the time data; and
wirelessly transmitting, at a first time corresponding to the time data, a control signal to cause the second device to perform a first action, said first time indicated by said internal clock.

24. The method of claim 23 further comprising:
wirelessly receiving a signal from the second device in response to the second device receiving the control signal.

25. The method of claim 24, wherein the received signal is an acknowledgment from the second device.

26. The method of claim 24, wherein the received signal includes status information from the second device.

27. The method of claim 23 further comprising:
wirelessly transmitting, at a second time corresponding to the time data, a second control signal to cause the second device to perform a second action.

28. The method of claim 23, wherein the first action includes one of activating the device, deactivating the device, or adjusting a setting of the second device.

29. The method of claim 23, further comprising:
permitting a user to enter data to the device schedule menu for controlling operation of a plurality of second devices, the operation of each of the plurality of second devices to be controlled in accordance with respective time data entered via the device schedule menu for a corresponding one of the plurality of second devices.

30. The method of claim 23 further comprising:
permitting a user to enter a regular time period for wirelessly retransmitting the control signal to cause the second device to perform the first action.

31. The method of claim 23 further comprising: wirelessly transmitting the control signal through a cell phone to the second device.

32. The method of claim 23 further comprising: wirelessly transmitting the control signal through a relay to the second device.

33. The method of claim 23 further comprising:
alarming before wirelessly transmitting the control signal; and permitting a user to cancel the wireless transmitting of the control signal before the control signal is wirelessly transmitted after the alarming.

* * * * *